(12) United States Patent
Dineen

(10) Patent No.: US 7,730,589 B2
(45) Date of Patent: Jun. 8, 2010

(54) POWER TOOL WITH GEL GRIP INCLUDING AN INTEGRAL BACKING

(75) Inventor: Christopher J. Dineen, Newcastle (GB)

(73) Assignee: Black & Decker Inc., Newark, DE (US)

( * ) Notice: Subject to any disclaimer, the term of this patent is extended or adjusted under 35 U.S.C. 154(b) by 989 days.

(21) Appl. No.: 11/440,302

(22) Filed: May 24, 2006

(65) Prior Publication Data
US 2006/0275089 A1 Dec. 7, 2006

Related U.S. Application Data

(60) Provisional application No. 60/685,743, filed on May 27, 2005.

(51) Int. Cl.
*B25G 1/10* (2006.01)
(52) U.S. Cl. .......................................... 16/430; 81/489
(58) Field of Classification Search .................. 16/430, 16/110.1, 421, 431, 435, DIG. 12, DIG. 18, 16/DIG. 19; 81/489, 177.1, 177.6; 74/543; 15/143.1, 144.1
See application file for complete search history.

(56) References Cited

U.S. PATENT DOCUMENTS

| | | | |
|---|---|---|---|
| 4,416,166 A | 11/1983 | Jannard et al. | |
| 4,721,021 A | 1/1988 | Kusznir | |
| 4,739,536 A | 4/1988 | Bandera et al. | |
| 5,088,734 A | 2/1992 | Glava | |
| 5,267,487 A | 12/1993 | Falco et al. | |
| 5,280,735 A | 1/1994 | Kuipers et al. | |
| 5,893,297 A | 4/1999 | Rowe | |
| 5,926,911 A | 7/1999 | Chen | |
| 6,108,870 A | 8/2000 | Lo | |
| 6,158,910 A | 12/2000 | Jolly et al. | |
| 6,237,193 B1 | 5/2001 | Skerker et al. | |
| 6,247,204 B1 | 6/2001 | Hamby et al. | |
| 6,308,378 B1 | 10/2001 | Mooty et al. | |
| 6,338,290 B1 | 1/2002 | Lin | |
| 6,858,286 B1 | 2/2005 | Simm et al. | |
| 6,951,046 B2 * | 10/2005 | Robinson ..................... | 16/431 |
| 6,968,599 B2 * | 11/2005 | Blauer et al. .................. | 16/431 |
| 7,004,655 B2 * | 2/2006 | Ferrara ......................... | 401/6 |
| 7,172,415 B2 * | 2/2007 | Harvey et al. .................. | 433/1 |
| 7,201,643 B2 * | 4/2007 | Dineen et al. ............... | 451/356 |
| 7,363,685 B2 * | 4/2008 | Walker et al. ................. | 16/430 |
| 2004/0078936 A1 | 4/2004 | Walker et al. | |

(Continued)

FOREIGN PATENT DOCUMENTS

DE 709757 8/1941

(Continued)

*Primary Examiner*—William L. Miller
(74) *Attorney, Agent, or Firm*—Harness, Dickey & Pierce, P.L.C.

(57) ABSTRACT

A power tool with a gel gripping member has a base with a desired configuration. The base has a desired structural rigidity such that when force is exerted on the base, the base substantially prohibits deflection. A flexible layer covers the base. The flexible layer has a mating configuration slightly larger than the base to form a pocket. A gel material is positioned into the pocket to provide resilient characteristics. A mechanism on the base enables the gel gripping member to be secured with the housing of the power tool.

23 Claims, 4 Drawing Sheets

U.S. PATENT DOCUMENTS

| | | | |
|---|---|---|---|
| 2004/0217205 A1 * | 11/2004 | Kohs et al. | 239/526 |
| 2005/0257944 A1 * | 11/2005 | Cooper | 173/217 |
| 2006/0003680 A1 * | 1/2006 | Robson | 451/357 |
| 2006/0143866 A1 * | 7/2006 | Lagaly et al. | 16/430 |
| 2006/0275089 A1 * | 12/2006 | Dineen | 408/9 |
| 2006/0277721 A1 * | 12/2006 | Barretta et al. | 16/421 |

FOREIGN PATENT DOCUMENTS

| | | |
|---|---|---|
| DE | 1006359 | 9/1957 |
| DE | 299 01 033 | 4/1999 |
| DE | 20002343 | 5/2000 |
| DE | 10139771 | 4/2002 |
| DE | 10055395 | 5/2002 |
| EP | 0 429 408 | 5/1991 |
| EP | 0 481 245 | 4/1992 |
| EP | 0 738 525 | 10/1996 |
| EP | 0 893 335 | 1/1999 |
| EP | 0 995 553 | 4/2000 |
| EP | 0 687 152 | 3/2001 |
| GB | 1464089 | 2/1977 |
| JP | 61-209884 | 9/1986 |
| JP | 7-205055 | 8/1995 |
| JP | 10-191745 | 7/1998 |
| SU | 477236 | 10/1975 |
| WO | WO 94-19990 | 9/1994 |
| WO | WO 02/30731 | 4/2002 |
| WO | WO 02/38341 | 5/2002 |

* cited by examiner

POWER TOOL WITH GEL GRIP INCLUDING AN INTEGRAL BACKING

CROSS-REFERENCE TO RELATED APPLICATIONS

This application claims the benefit of U.S. Provisional Application No. 60/685,743, filed on May 27, 2005 entitled "Power Tool with Gel Grip Including an Integral Backing". The disclosures of the above applications are incorporated herein by reference.

FIELD OF THE INVENTION

The present disclosure relates to power tools and, more particularly, to power tools that include a handle with a gel grip to provide vibration dampening during operation.

When utilizing hand tools, depending upon the use, vibration is created during use of the tool. The vibration, which is created during use, is fed back directly to the user. Thus, the user's hands, wrists, elbow, etc., absorbs the vibrational shock during use. Accordingly, it would be desirable to provide a hand tool which, during use, reduced vibration.

U.S. Patent Application No. 2004/0078936, assigned to the same assignee as the present disclosure, provides a gel grip to dampen vibration. In this disclosure, the handle includes a blister pack which includes the vibration dampening gel. The gel is vacuum formed or heat sealed in a bladder. Thus, the bladder ordinarily necessitates mounting onto a substantially flat planar surface, and must be accommodated as such. While the application works satisfactorily for its intended purpose, designers are always striving to improve the art.

The present disclosure provides the art with an improved gel grip for hand and power tools. The present disclosure provides the art with a low cost gel grip which has the ability to form to a curved surface of the tool. The present disclosure provides a backing member with substantial rigidity to provide the gel grip with a desired configuration. The present disclosure provides the art with a backing member that enhances dampening features. Accordingly, gel grips may be positioned on arcuate or angled surfaces and need not be specifically positioned on a planar surface.

According to a first aspect of the disclosure, a gripping member comprises a base with a desired configuration. The base has a desired structural rigidity, such that, when a force is exerted on the base, the base substantially prohibits deflection. A flexible layer covers the base. A pocket is formed between the flexible layer and the base. A gel material is inserted into the pocket to provide resilient characteristics to the gripping member. A mechanism is coupled with the base to enable the gripping member to be mounted in a housing. The base has a thin wall portion, preferably inside its periphery, to provide a hinging action. The resiliency enables displacement of the gel material during percussive loads to provide enhanced dampening. The mounting mechanism is a peripheral flange on the base. The base has an overall top hat cross section configuration. The flexible layer has a mating configuration to the base such that, when the flexible layer is overlaid on the base, it provides the pocket. Generally, a metallic layer is coated on the base to provide an aesthetic appearance. The base is generally non-planar along its longitudinal axis and may be arcuate, angled or the like.

According to a second aspect of the disclosure, a power tool comprises a housing with an opening. A motor is positioned within the housing. An output is coupled with the motor. The power source, via an activation member, is electrically coupled with the motor. The activation member activates and deactivates the motor which, in turn, drives the output. A gripping member is positioned in the housing opening. The gripping member comprises a base with a desired configuration. The base has a desired structural rigidity such that, when a force is exerted on the base, the base substantially prohibits deflection. A flexible layer covers the base to form a pocket between the flexible layer and the base. A gel material is inserted into the pocket to provide resilient characteristics to the gripping member. A mechanism coupled with the base enables the gripping member to be mounted in the housing opening. The power tool housing has a pair of housing members of the clamshell type to receive the mounting mechanism of the base. Also, a pressure sensor may be positioned in the gel or the base and is coupled with the actuation member to increase or decrease the speed of the output based on the force exerted by the user. The base has a thin wall portion, preferably inside its periphery, to provide a hinging action. The hinging action enables displacement of the gel material during percussive loads to provide enhanced dampening. The mounting mechanism is a peripheral flange extending radially from the base. The base has a top hat cross section configuration. The flexible layer has a mating configuration to the base and is slightly larger to form the pocket. A metallic layer is coated on the base to provide aesthetic characteristics. Also, the base is non-planar along its longitudinal axis so that it may be mounted on various curved, angled and other non-planar surfaces.

According to a third aspect of the disclosure, a gel grip is manufactured by comprising vacuum forming a thermoformed polyurethane film to produce an outer layer profile. The profile is cropped to provide a large perimeter around the vacuum formed profile. A base is formed with a metallic finish. The base along with an adhesive film is positioned into the profile of the cover layer. The assembly is placed into a fixture and the cover layer is welded to the plastic base about its periphery. The welding provides a weld around the perimeter; however, two areas, which become an inlet and outlet, are left open to allow access into a pocket formed between the cover layer and the base. The welded gel grip is then placed into a fixture. Gel is injected through the inlet into the pocket. Air escapes through the outlet until the gel fills the pocket. After the gel fills the pocket, the gel injection is halted and the part is removed from the fixture. The part is again placed in the fixture and the inlet and outlet are welded to produce a sealed gel grip member. The gel grip may be cropped and the waste removed from about the periphery and it is readied to be placed into a housing of a power tool.

From the following detailed description, taken in conjunction with the accompanying drawings and claims, other objects and advantages of the present invention will become apparent to those skilled in the art.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 4:
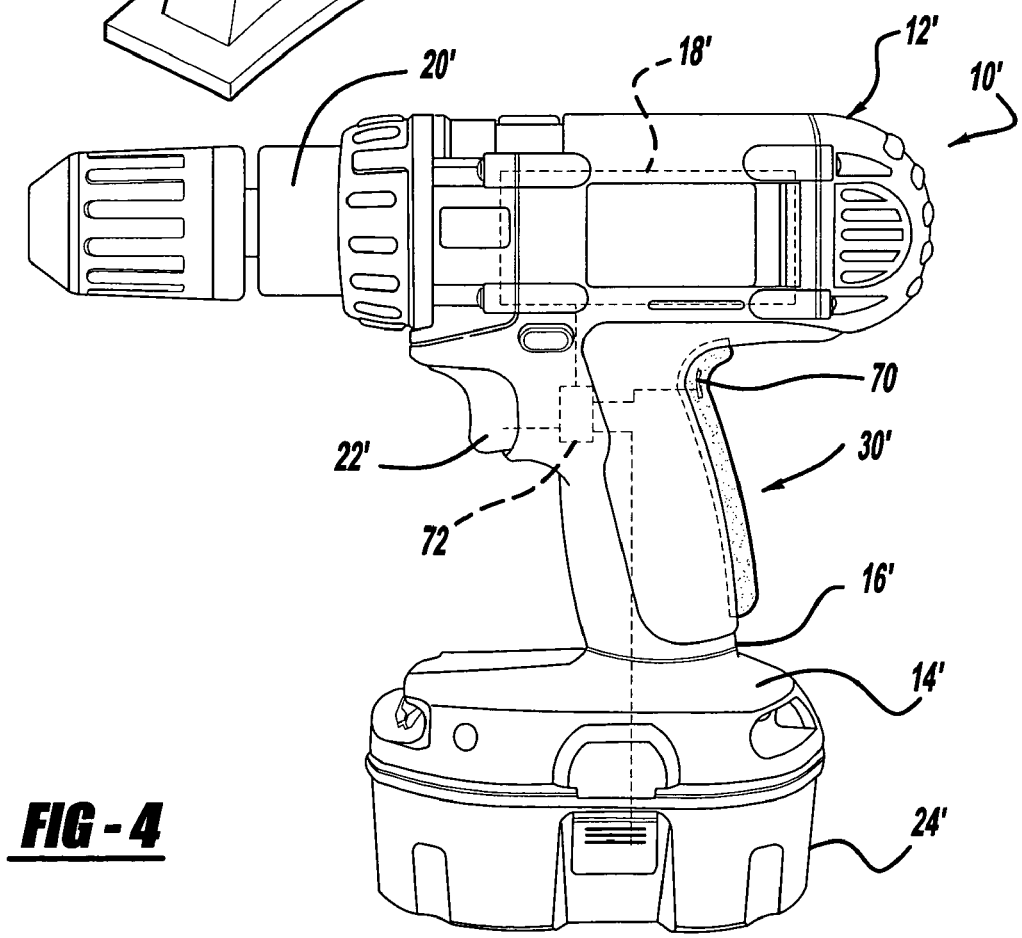
FIG. 4 is a plan view of a power tool including a gripping member in accordance with the present invention with a pressure sensor.

Turning to the drawings, a power tool is illustrated and designated with the reference numeral 10. The power tool includes a housing 12 with a pair of clamshell type housing members 14 and 16. A motor 18, coupled with an output 20, is positioned inside of the housing 12. An activation member 22 is positioned in the housing. The activation member 22 is electrically coupled with a power source 24 and the motor 18. Here, the power source 24 is shown as a cord which is coupled with a conventional AC outlet. However, a battery, as shown in FIG. 4, could act as the power source. Upon energizing or de-energizing the activation member 22, the motor is activated or deactivated which, in turn, drives the output which, in this case, would drive a reciprocating blade in the illustrated saber or jig saw. The housing 12 includes a handle portion 26 which includes a gel member 30.

Figure 2:
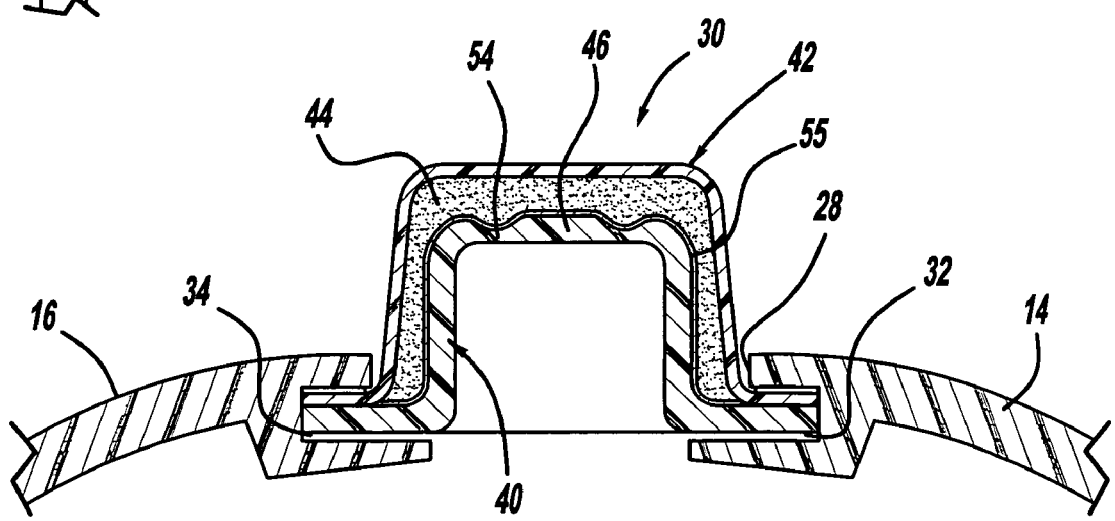
FIG. 2 is a cross section view of FIG. 1 along line 2-2 thereof.

The gel member 30, as best seen in FIG. 2, is captured in an aperture 28 in the housing 12. The aperture 28 is formed between the housing halves 14 and 16. The housing halves 14 and 16 include recesses 32 and 34 which receive the gel member 30. The recesses 32 and 34 are elongated channels peripherally positioned about the opening 28 to receive the gel member 30.

Figure 1:
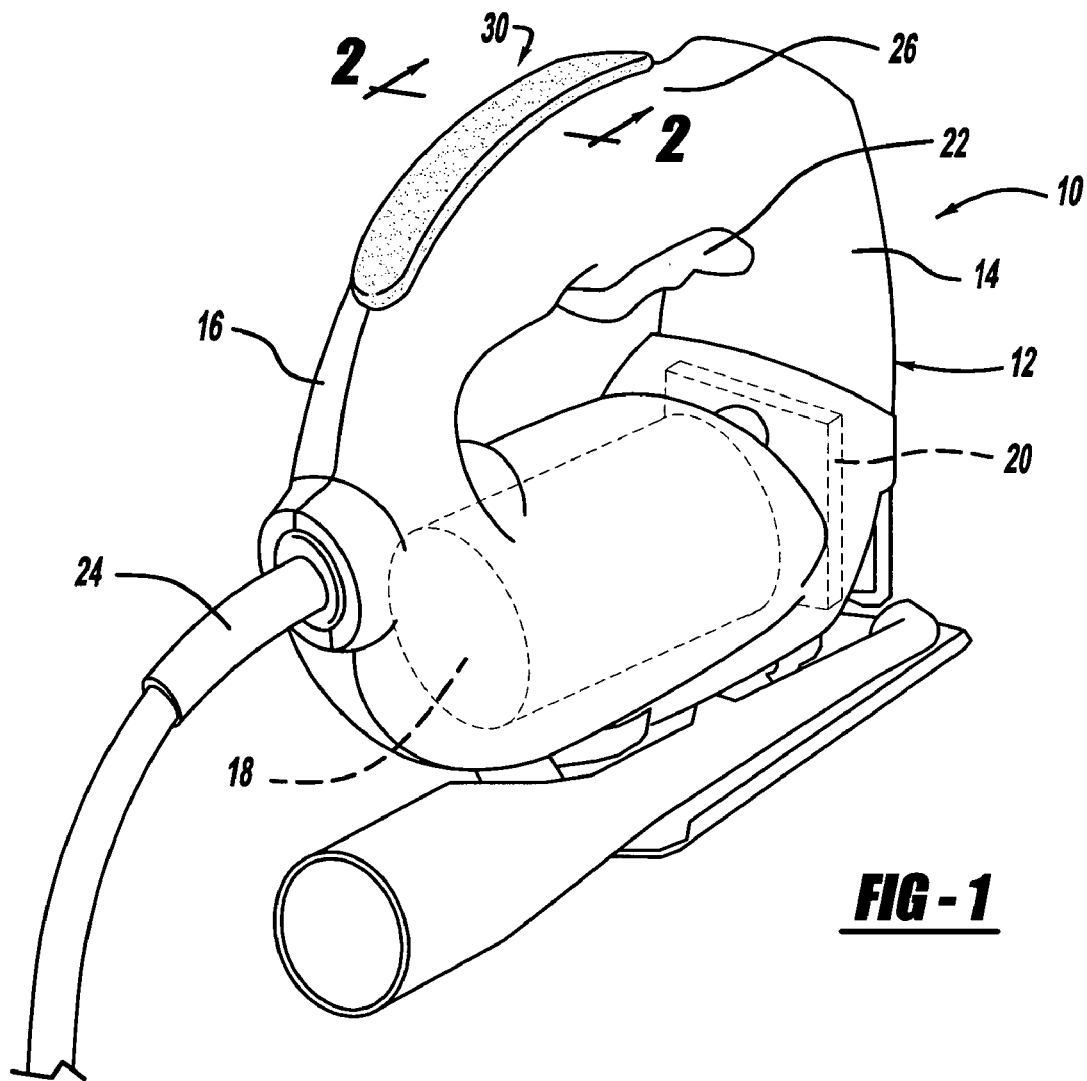
FIG. 1 illustrates a gel grip on a power tool in accordance with the present invention.
Figure 3:
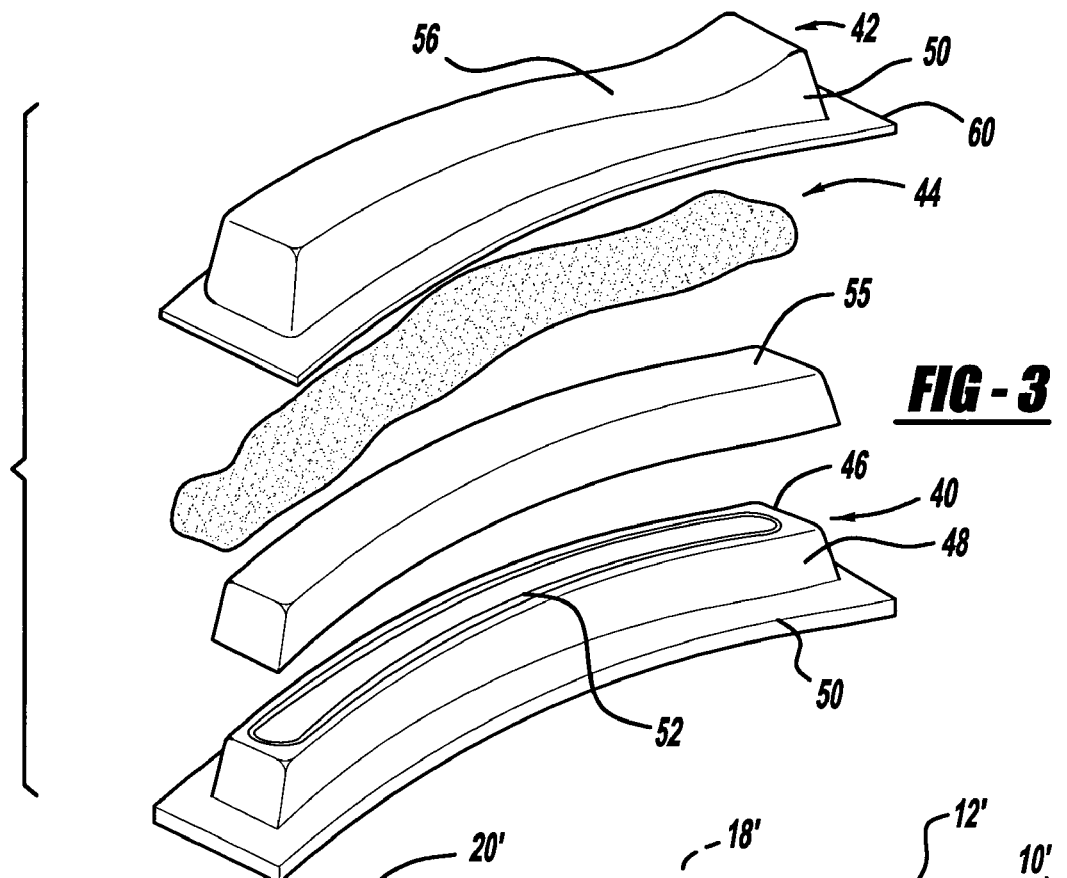
FIG. 3 is an exploded view of the gripping member in accordance with the present invention.

The gel member 30, best seen in FIG. 3, includes a base member 40, a cover layer 42, a metallic layer 55, and a gel material 44. The base member 40, while being made from a polymeric material, has a sufficient rigidity to provide a desired configuration for the base. The base 40 may have a desired arcuate or non-planar configuration along its longitudinal and/or lateral axes. The base 40, as well as the gel member is positioned onto the tool as illustrated in FIGS. 1 and 4.

The base member 40 has an overall hat shape configuration in cross-section. The base has a top wall 46 which is surrounded by an extending circumferential side wall 48. The side wall 48 extends, substantially perpendicular, from the periphery of the top wall 46. Also, a flange 50 extends peripherally about and substantially perpendicular to the side wall 48. The top wall 46 may have a desired configuration, shown here as a rectangle. Thus, the side wall 48, having four rectangular portions, provides an overall box appearance with the top wall 46. The top wall 46 includes a groove 52 which is spaced from the periphery of the top wall 46. The groove 52 forms a localized thin wall section 54 in the top wall 46. The thin wall 54 provides a hinge point in the top wall 46 which enables the gel material to be displaced under percussive load to enhance the dampening effect of the gel member 30.

The flange 50 extends about the periphery of the base to enable the base to be captured in the recess channels 32 and 34 of the housing members 14 and 16. Thus, as can be seen in FIG. 2, the flange 50 is captured in the recesses 32 and 34 to mount the gel member 30 in the housing 12 of the power tool 10.

Also, the base 40 may include a metallic layer 55 which may be electroplated or otherwise vacuum metallized onto the surface. Ordinarily, a chromium layer is overlaid on the base to provide a metallic appearance through the transparent gel. This provides a silver highly polished surface which provides an aesthetic appearance.

The cover layer 42 has a mating configuration to the base 40. The cover layer 42 includes a top wall 56 an extending circumferential side wall 58 and a flange 60. The dimensions of the walls 56, 58 and flange 60 are slightly larger than the base to form a gel receiving pocket 62 between the base 40 and the cover layer 42. The gel material 44 is inserted into the pocket 62. The cover layer 42 has resilient characteristics and has a pleasing feel to the user's touch. Ordinarily, the transparent cover layer 42 may be a thin polyurethane skin having a desired thickness. The cover layer 42 may be produced as a vacuum formed part with a desired three dimensional configuration which is only limited in curvature available by the thermoforming limitations of the thermoform polyurethane film.

The present invention enables the gel grip member 30 to be placed on substantially any surface of the tool. The present invention enables the gel member 30 to be positioned on a curve surfaces of the saber saw, drill handles or the like wherever a user will benefit in degrees of comfort. Also, due to the base and cover layer, a decreasing amount of gel material is required per component.

Turning to FIG. 4, a power tool is illustrated and designated with the reference numeral 10'. The power tool includes a housing 12' with housing halves 14' and 16'. The housing includes a motor 18', an output 20', as well as an activation member 22'. The power tool 10' includes a power source 24' illustrated as a battery. The activation member 22' is electrically coupled with the battery 24' and motor 18' to activate and deactivate the motor 18' which, in turn, drives the output 20'. Also, a gel member 30 is captured between the housing halves 14 and 16 as previously described. The gel member 30' is substantially the same as that described above. As can be seen in FIG. 4, the gel member has a more severe curved portion at one of its ends.

A pressure sensing device 70 may be positioned within the gel member 30. The pressure sensing device 70 may be positioned directly onto the base 40 or it may be positioned inside of the gel material 44. The pressure sensing mechanism 70 is electrically connected to a control switch 72 which controls the current to the motor and, in turn, controls the speed of the output 20'. Thus, during operation of the power tool 10', in this example a drill, a user exerts a forward force on the rear of the drill handle. A signal is sent to the speed control circuitry 72 which will translate the user's forward force on the rear of the drill handle to reduce or increase the drill speed. Accordingly, this will result in more efficient drilling into various types of material.

Figure 5:
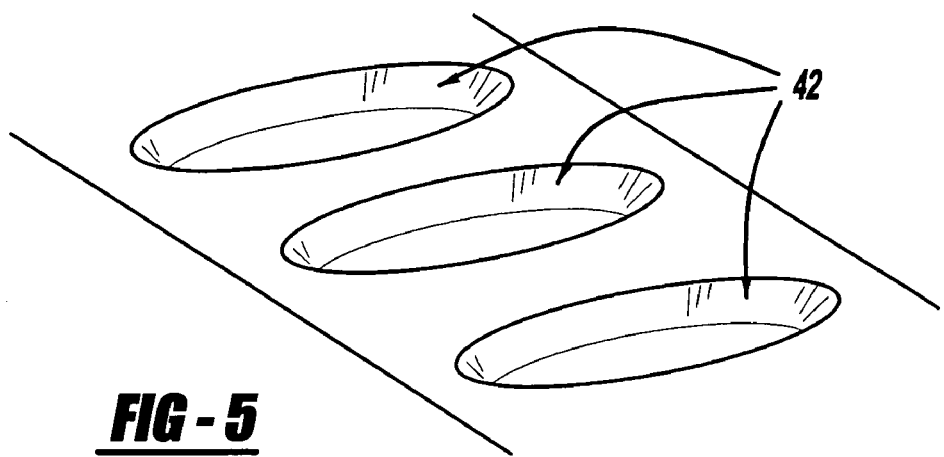
FIGS. 5-9 are a schematic representation of a method for forming a gel grip.
Figure 6:
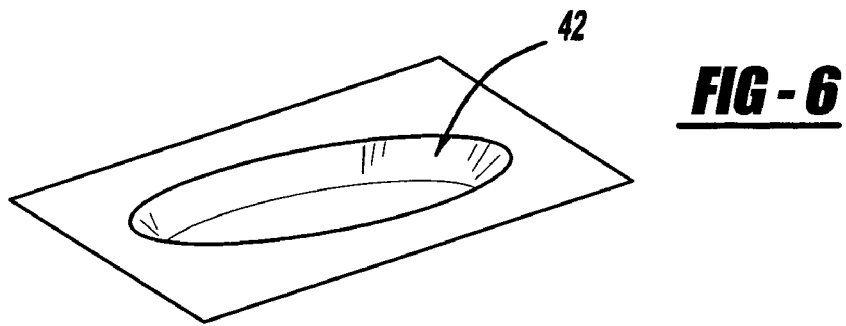
Figure 7:
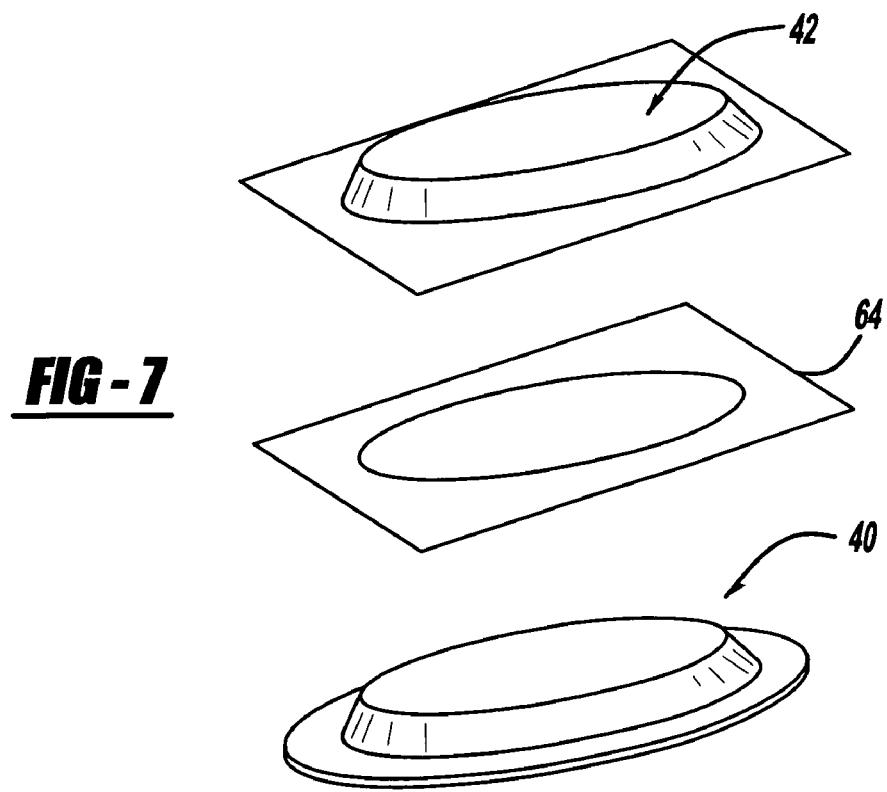
Figure 8:
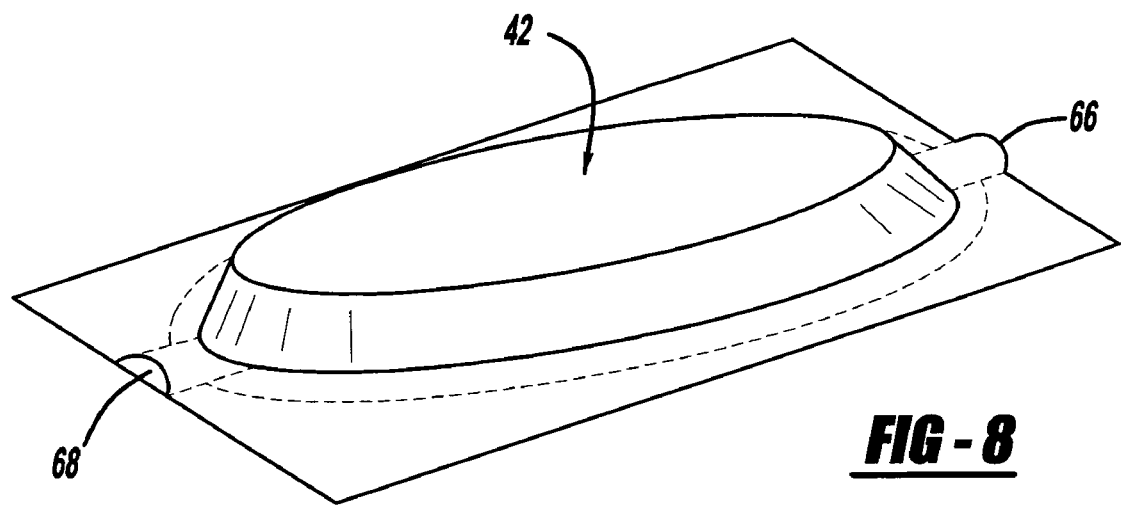
Figure 9:
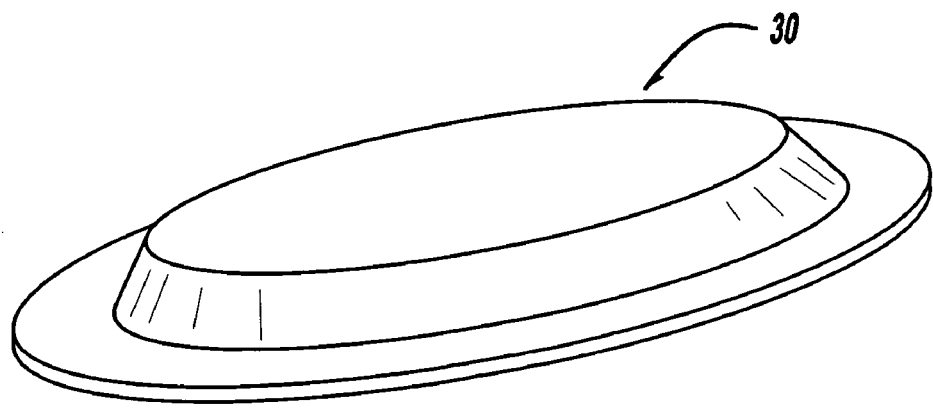

Turning to FIGS. 5 through 9, a method of forming the gel member is illustrated. The cover layer 42 is vacuum formed to produce the outer skin profile (FIG. 5). The cover layer 42 may include a textured surface on the cover layer as it is formed from a thermoform polyurethane film. After the cover layer 42 is formed, it is cut or cropped to provide a large diameter about the vacuum profile (FIG. 6). In order to mechanically bond the thermoform polyurethane film to the plastic metallized base, an intermediate or gasket layer of hot metal adhesive film 64 is placed over the rim of the base (FIG. 7). The base 40 with the metallized finish is placed in an upturned position and placed into the thermoform polyurethane film cover layer 42. This enables the cover layer 42 to be bonded to the base member 40. After the base 40 is placed into the cover layer 42, the assembly is placed into a fixture. The thermoformed polyurethane film layer is welded to the plastic carrier around its periphery (FIG. 8). The welding represents a first stage weld. In the first stage weld, two areas 66, 68 are left unwelded, which will become the injection 66 and venting points 68 of the gel grip. After the first stage welding is done, the product is placed into a fixture. The fixture is designed to hold the shape of the outer thermoformed form polyurethane film cover layer while the gel 44 is injected through the injection point 66. While the gel 44 is injected, air escapes through the venting point 68. The gel is injected until the gel is forced through the venting point. At this time, the process is halted. The part is removed from the fixture and set aside for the next step. The assembly is now placed in a fixture and the remaining non-welded areas are welded. This produces a sealed gel grip component. In the final stage, the gel grip component is cropped and the peripheral material is removed from the part. Accordingly, the part is ready to be added to the housing of a power tool.

While the above provides a detailed description of the preferred embodiment, those in the art will appreciate that other modifications, alterations and variations may be made to the present disclosure without deviating from the scope and spirit of the disclosure.

What is claimed is:

1. A gripping member comprising
a base having a desired configuration, said base having a desired structural rigidity such that when a force is exerted on said base, said base substantially prohibits deflection of said base;
a flexible layer covering said base such that a pocket is formed between said flexible layer and said base;
a gel material positioned in said pocket providing a resilient characteristic to said gripping member;
a mechanism coupled with said base for enabling said gripping member to be mounted with a housing; and
wherein said base has at least one groove in a top surface thereof to define a thin wall portion providing a hinging action to enable displacement of said gel material during percussive loads.

2. The gripping member according to claim 1, wherein said mechanism being a peripheral flange on said base.

3. The gripping member according to claim 1, wherein said base has a top hat cross-section configuration.

4. The gripping member according to claim 3, wherein said flexible layer has a mating configuration larger than said base for providing said pocket.

5. The gripping member according to claim 1, wherein a metallized layer is coated on said base.

6. The gripping member according to claim 1, wherein said base is non-planar along its longitudinal axis.

7. A power tool comprising:
a housing having an opening;
a motor in said housing;
an output coupled with said motor;
a power source;
an activation member coupled with said motor and said power source for activating and deactivating said motor which, in turn, drives said output; and
a gripping member positioned in said housing opening, said gripping member comprising:
a base having a desired configuration, said base having a desired structural rigidity such that when a force is exerted on said base, said base substantially prohibits deflection of said base;
a flexible layer covering said base such that a pocket is formed between said flexible layer and said base;
a gel material positioned in said pocket providing a resilient characteristic to said gripping member;
a mechanism coupled with said base for enabling said gripping member to be mounted with said housing; and
wherein said base has at least one groove in a top surface thereof to define a thin wall portion providing a hinging action to enable displacement of said gel material during percussive loads.

8. The power tool according to claim 7, wherein said housing has a pair of housing members for receiving said mounting mechanism.

9. The power tool according to claim 7, further comprising a pressure sensor in said gel member and coupled with said activation member for increasing or decreasing speed of said output based on force exerted by a user.

10. The power tool according to claim 7, wherein said mechanism being a peripheral flange on said base.

11. The power tool according to claim 7, wherein said base has a top hat cross-section configuration.

12. The power tool according to claim 11, wherein said flexible layer has a mating configuration larger than said base for providing said pocket.

13. The power tool according to claim 7, wherein a metallized layer is coated on said base.

14. The power tool according to claim 7, wherein said base is non-planar along its longitudinal axis.

15. The power tool according to claim 7, further comprising a portion of said base projecting above a surface of said housing.

16. The gripping portion according to claim 15, wherein said gel surrounding said portion and taking shape of said portion.

17. The gripping portion according to claim 16, wherein a skin surrounds said gel taking shape of said portion.

18. The gripping portion according to claim 7, wherein said base conforming to a curved surface of said housing.

19. A gripping member for a power tool comprising:
a base having a desired configuration, said base having a desired structural rigidity such that when a force is exerted on said base, said base substantially prohibits deflection of said base;
a flexible layer covering said base such that a pocket is formed between said flexible layer and said base;
a gel material positioned in said pocket providing a resilient characteristic to said gripping member;
a mechanism coupled with said base for enabling said gripping member to be mounted with a housing, said mechanism being a peripheral flange on said base; and
wherein said base has at least one groove on a top surface thereof to define a thin wall portion providing a hinging action to enable displacement of said gel material during percussive loads.

20. The gripping member according to claim 19, further comprising a portion of the base projects above the mechanism coupling the base.

21. The gripping member according to claim 20, wherein said gel surrounding said portion and taking shape of said portion.

22. The gripping member according to the claim 21, wherein a skin surrounds said gel taking shape of said portion.

23. A gripping member for a power tool comprising:
a base having a desired configuration, said base having a desired structural rigidity such that when a force is exerted on said base, said base substantially prohibits deflection of said base;
a metalized layer is coated on said base;
a flexible layer covering said base such that a pocket is formed between said flexible layer and said base;
a gel material positioned in said pocket providing a resilient characteristic to said gripping member;
a mechanism coupled with said base for enabling said gripping member to be mounted with a housing; and
wherein said base has at least one groove in a top surface thereof to define a thin wall portion providing a hinging action to enable displacement of said gel material during percussive loads.

* * * * *